(12) United States Patent
Park et al.

(10) Patent No.: US 9,293,962 B2
(45) Date of Patent: Mar. 22, 2016

(54) HOLLOW DRIVING MODULE

(71) Applicant: KOREA INSTITUTE OF MACHINERY & MATERIALS, Daejeon (KR)

(72) Inventors: Chan Hun Park, Daejeon (KR); Jin-Ho Kyung, Daejeon (KR); Tae Yong Choi, Daejeon (KR); Hyun Min Do, Daejeon (KR); Dong Il Park, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 604 days.

(21) Appl. No.: 13/713,334

(22) Filed: Dec. 13, 2012

(65) Prior Publication Data

US 2013/0257230 A1 Oct. 3, 2013

(30) Foreign Application Priority Data

Mar. 30, 2012 (KR) .................. 10-2012-0032907
Mar. 30, 2012 (KR) .................. 10-2012-0032940
Mar. 30, 2012 (KR) .................. 10-2012-0033089

(51) Int. Cl.
*H02K 11/00* (2006.01)
*H02K 7/00* (2006.01)
*H02K 7/116* (2006.01)

(52) U.S. Cl.
CPC ............. *H02K 7/003* (2013.01); *H02K 7/116* (2013.01); *H02K 11/0015* (2013.01); *H02K 11/0042* (2013.01)

(58) Field of Classification Search
CPC ... H02K 7/003; H02K 7/116; H02K 11/0042; H02K 11/0015; F16H 1/32; F16H 49/001; G01L 3/14

USPC ................................ 310/68 B, 83
See application file for complete search history.

(56) References Cited

U.S. PATENT DOCUMENTS

| 2,906,143 A | 9/1959 | Musser |
| 5,437,490 A | 8/1995 | Mimura |
| 8,384,260 B2* | 2/2013 | Kanayama .............. 310/83 |
| 2006/0192517 A1 | 8/2006 | Miyashita et al. |
| 2007/0039414 A1* | 2/2007 | Takemura ............... 74/640 |

(Continued)

FOREIGN PATENT DOCUMENTS

| CN | 2401448 | 10/2000 |
| CN | 1963267 | 5/2007 |

(Continued)

*Primary Examiner* — Dang Le
*Assistant Examiner* — Leda Pham
(74) *Attorney, Agent, or Firm* — Lex IP Meister, PLLC

(57) ABSTRACT

The present invention relates to a hollow driving module comprising a hollow driving module including a hollow motor including a stator, a rotor rotating with respect to the stator and having a perforated center portion, and a rotation shaft disposed at and coupled to the perforated center portion of the rotor; a decelerator connected with the rotation shaft positioned at an output side of the hollow motor to decelerate rotation of the rotation shaft; a torque transmission unit being connected to an output side of the decelerator to be driven by a decelerated rotation angle; a first encoder positioned at an input side opposite to a side connected with the decelerator of the hollow motor; a second encoder positioned at a side opposite to a side connected with the hollow motor of the first encoder; and a link connection means connecting the second encoder with the torque transmission unit.

15 Claims, 15 Drawing Sheets

(56) References Cited

U.S. PATENT DOCUMENTS

| | | | |
|---|---|---|---|
| 2008/0098839 A1* | 5/2008 | Maruyama et al. | 74/412 R |
| 2010/0005907 A1* | 1/2010 | Kato et al. | 73/862.044 |
| 2011/0183805 A1 | 7/2011 | Chan | |
| 2011/0239788 A1* | 10/2011 | Nagasaka et al. | 73/862.338 |
| 2013/0144553 A1* | 6/2013 | Omata et al. | 702/151 |

FOREIGN PATENT DOCUMENTS

| | | | |
|---|---|---|---|
| CN | 101865275 | 10/2010 | |
| JP | 03-054352 | 5/1991 | |
| JP | 2000-320622 | 11/2000 | |
| JP | 2002-372118 | 12/2002 | |
| JP | 2005-069402 | 3/2005 | |
| JP | 2006-050710 | 2/2006 | |
| JP | 2006-271189 | 10/2006 | |
| JP | 2007-321879 | 12/2007 | |
| JP | 2010-269412 | 12/2010 | |
| KR | 10-2002-0038799 | 5/2002 | |
| KR | 10-0984544 | 7/2005 | |
| KR | 10-2005-0104399 | 11/2005 | |
| KR | 10-0642307 | 10/2006 | |
| KR | 10-0882920 | 2/2009 | |
| KR | 10-0884274 | 2/2009 | |
| KR | 10-2010-0094731 | 8/2010 | |
| KR | 10-2011-0018748 | 2/2011 | |
| KR | 10-1054507 | 3/2011 | |
| KR | 10-1050229 | 7/2011 | |
| KR | 10-2011-0133307 | 12/2011 | |
| KR | 10-2012-0021410 | 3/2012 | |
| WO | WO 2007082594 A2 * | 7/2007 | B25J 9/10 |
| WO | 2009-125585 | 10/2009 | |
| WO | 2010-089796 | 8/2010 | |
| WO | WO 2010089796 A1 * | 8/2010 | H02K 11/00 |
| WO | 2010-101203 | 9/2010 | |

* cited by examiner

HOLLOW DRIVING MODULE

CROSS-REFERENCE TO RELATED APPLICATION

This application claims priority to and the benefit of Korean Patent Application Nos. 10-2012-0033089, 10-2012-0032907, 10-2012-0032940 filed in the Korean Intellectual Property Office on Mar. 30, 2012, the entire contents of which are incorporated herein by reference.

BACKGROUND OF THE INVENTION (a) Field of the Invention
The present invention relates to a hollow driving module.
(b) Description of the Related Art
In general, an industrial robot configures a joint with a solid decelerator, a servo motor, and a brake, and controls a position or a speed by receiving feedback of the position and the speed by using a solid rotation angle sensor 30 of a shaft 20 of the servo motor 10 as illustrated in FIG. 1. However, in this case, a power line 40 and a sensor line of the servo motor 10 are exposed outside of a robot main body 50.

In a manufacturing business field using a robot, lightness and simplification of a robot have been recently demanded for densifying an operation process and space.

In order to achieve a light and simplified industrial robot, it is necessary to commonly use components and the components should be densely disposed in order to decrease weight and volume by integrally forming the decelerator (not illustrated) and the servo motor 10 configuring the joint of the robot, and the components need to be formed in a hollow type so that a power supply line, the sensor line, and various utility lines 70 pass through central axes of the components thereof.

Accordingly, a robot manufacturing company shows an action to respond to the demands of the lightness and simplification of the robot by making an actuator 80 become light and slim by commonly using the components and a high-density arrangement design of the components by integrating the servo motor 10, the decelerator (not illustrated), and the brake (not illustrated) as illustrated in FIGS. 1 and 2. Further, the simplification of the robot is attempted by designing so that a hole is formed at a center of the integrated actuator 80 and the power line 40 and the utility line 70 pass through the actuator 80.

Korean Patent Registration No. 0642307 entitled "Hollow Motor Decelerator" discloses the invention related to a hollow motor decelerator in which each of a main body of a hollow decelerator and an entirety of a hollow motor is assembled through separate processes.

In the meantime, the aforementioned hollow driving module for driving the link by using the hollow motor transmits torque to the output side (link) by reducing a rotation speed of the motor through the decelerator and amplifying the torque.

However, torque loss is essentially generated in the hollow driving module during the process, so that it is difficult to measure an accurate torque and an accurate rotation angle of the output side.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a hollow driving module which measures an accurate torque of the output side.

And the present invention has been made in an effort to provide a hollow driving module which measures an accurate rotation angle of the output side.

An exemplary embodiment of the present invention provides a hollow driving module, including: a hollow motor including a stator, a rotor rotating with respect to the stator and having a perforated center portion, and a rotation shaft disposed at and coupled to the perforated center portion of the rotor and having a first perforated hollow portion at a center thereof; a decelerator connected with the rotation shaft positioned at an output side of the hollow motor to decelerate rotation of the rotation shaft and having a perforated second hollow portion at a center thereof; a torque transmission unit being connected to an output side of the decelerator to be driven by a decelerated rotation angle; a first encoder positioned at an input side opposite to a side connected with the decelerator of the hollow motor, connected with the rotation shaft to measure a rotation angle of the hollow motor, and having a perforated third hollow portion at a center thereof; a second encoder positioned at a side opposite to a side connected with the hollow motor of the first encoder and measuring a rotation angle of the output side of the decelerator and having a perforated fourth hollow portion at a center thereof; and a link connection means connecting the second encoder with the torque transmission unit.

The decelerator may be a harmonic decelerator, and may include: a cup-shaped flex spline connected with the torque transmission unit and provided with gear teeth at an external circumferential surface at an opening side of a body; a circular spline provided with gear teeth at an internal circumferential surface to correspond to the gear teeth at the external circumferential surface of the flex spline; and a wave generator coupled to the internal circumferential surface of the opening of the flex spline and connected with the rotation shaft positioned at the output side of the hollow motor.

The hollow driving module may include a cross roller bearing of which an inner rim is connected with the circular spline of the decelerator and an outer rim is connected with the torque transmission unit. The hollow driving module may include a torque sensor of which an exterior side is connected to an outer rim of the cross roller bearing to be supported and being connected with the decelerator through the torque transmission unit to measure torque transmitted from the output side of the decelerator.

In the hollow driving module, a first driving link is disposed at an edge of the torque sensor.

The link connection means may include a pipe-shaped first connection member inserted in the first to the fourth hollow portions to be connected with the second encoder and a second connection member of which an end at a side position in the torque sensor extends in a radial direction to be connected to the first driving link.

The torque sensor may be a torque sensor of one degree of freedom including: an interior frame having a fifth hollow portion communicating with the second hollow portion; an exterior frame formed while being spaced apart from the interior frame by a predetermined distance in a radial direction; one or more connection beams formed between the interior frame and the exterior frame and configured to measure torque transmitted from the output side of the decelerator; and a strain gauge formed at one side or both sides of the connection beam to measure torque by the amount of transformation of the connection beam.

In the hollow driving module, the third hollow portion and the fourth hollow portion may have the same diameter, and the hollow driving module includes a first ring portion having an internal circumferential surface having a larger diameter than that of an external circumferential surface of the first connection member between the third hollow portion and the first connection member, and a second ring portion having an internal circumferential surface having the same diameter as that of the external circumferential surface of the first connection member between the fourth hollow portion and the first connection member.

In the hollow driving module, the external circumferential surface of the first connection member is in contact with the internal circumferential surface of the second ring portion to be coupled thereto, and a space is formed between the internal circumferential surface of the first, second, and fifth hollow portions and the first ring portion, and the external circumferential surface of the first connection member.

The hollow driving module may include a blocking bearing installed between the torque transmission unit and the fixed side of the decelerator to block axis-directional force transmitted from the output side of the decelerator to the torque sensor.

The blocking bearing may be a ball bearing having clearance of 10 to 50 μm.

The hollow driving module may include: a first bearing of which an inner rim is connected with the first connection member so as to prevent the first connection member from being shaken; and a second bearing of which an inner rim is connected with the rotation shaft so as to prevent the rotation shaft from being shaken.

The second connection member may extend from an end of one side of the first connection member to the first driving link in a radial direction, and may be shaped like a plurality of bars spaced apart from each other by a predetermined distance in a circumferential direction.

The second connection member may extend from an end of one side of the first connection member to the first driving link in a radial direction, and may be a donut-shaped plate having a hollow center.

The hollow driving module may be applied to a joint of a robot.

An exemplary embodiment of the present invention provides a hollow driving module, including: a hollow motor including a stator, a rotor rotating with respect to the stator and having a perforated center portion, and a rotation shaft disposed at and coupled to the perforated center portion of the rotor and having a first perforated hollow portion at a center thereof; a decelerator connected with the rotation shaft positioned at an output side of the hollow motor to decelerate rotation of the rotation shaft and having a perforated second hollow portion at a center thereof; a torque transmission unit being connected to an output side of the decelerator to be driven by a decelerated rotation angle; a torque sensor of which an exterior side is connected to an outer rim of the cross roller bearing to be supported and being connected with the decelerator through the torque transmission unit to measure torque transmitted from the output side of the decelerator; a blocking bearing installed between the torque transmission unit and the fixed side of the decelerator to block axis-directional force transmitted from the output side of the decelerator to the torque sensor.

The decelerator may be a harmonic decelerator, and may include: a cup-shaped flex spline connected with the torque transmission unit and provided with gear teeth at an external circumferential surface at an opening side of a body; a circular spline provided with gear teeth at an internal circumferential surface to correspond to the gear teeth at the external circumferential surface of the flex spline and serving as a fixed side for supporting an inner rim of the cross roller bearing; and a wave generator coupled to the internal circumferential surface of the opening of the flex spline and connected with the rotation shaft positioned at the output side of the hollow motor.

The torque sensor may be a torque sensor of one degree of freedom including: an interior frame having a fifth hollow portion communicating with the second hollow portion; an exterior frame formed while being spaced apart from the interior frame by a predetermined distance in a radial direction; one or more connection beams formed between the interior frame and the exterior frame and configured to measure torque transmitted from the output side of the decelerator; and a strain gauge formed at one side or both sides of the connection beam to measure torque by the amount of transformation of the connection beam.

The blocking bearing may be a ball bearing having clearance of 10 to 50 μm.

The hollow driving module may include a first encoder positioned at an input side opposite to a side connected with the decelerator of the hollow motor, connected with the rotation shaft to measure a rotation angle of the hollow motor, and having a perforated third hollow portion at a center thereof.

The hollow driving module may include a second encoder positioned at a side opposite to a side connected with the hollow motor of the first encoder and having a perforated fourth hollow portion at a center thereof and measuring a rotation angle of the output side of the decelerator by being connected the fourth hollow portion to the output side of the decelerator through a pipe-shaped link connection means inserted in the first to the fourth hollow portions.

The hollow driving module of the present invention has an advantage in that an actual rotation angle of the first driving link may be measured, and cable twist is prevented because the first encoder and the second encoder are positioned at an input side of the hollow motor.

That is, the hollow driving module of the present invention may measure both the rotation angle of the hollow motor and the actual torque of the output side applied to the first driving link, thereby improving control accuracy Further, in the hollow driving module of the present invention, the blocking bearing having small clearance is installed between the torque transmission unit and the fixed side of the decelerator in order to prevent inaccurate torque measurement by the torque sensor due to the application of force to the torque sensor according to push in or out of the output side of the decelerator in an axis direction when the decelerator rotates, thereby blocking axis-directional force transmitted to the torque sensor and thus improving torque measurement accuracy, and employing a simple torque sensor of one degree of freedom.

In addition, the hollow driving module of the present invention uses the hollow motor of which the center is perforated, so that the links are continuously connected, and when the hollow driving module of the present invention is applied to a robot including a driving module for each rotation shaft, it is possible to innovatively reduce weight of the entire robot and to make a cable of each driving module pass through the center, thereby achieving tidier appearance.

Furthermore, the hollow driving module of the present invention uses two encoders so as to measure both of the rotation angle of the hollow motor and the rotation angle of the output side and the encoders are arranged in the input side of the motor, so that it is possible to use a commercialized general encoder and to modularize two encoders into one module, thereby decreasing manufacturing costs and improving use convenience.

DETAILED DESCRIPTION OF THE EMBODIMENTS

Figure 1:
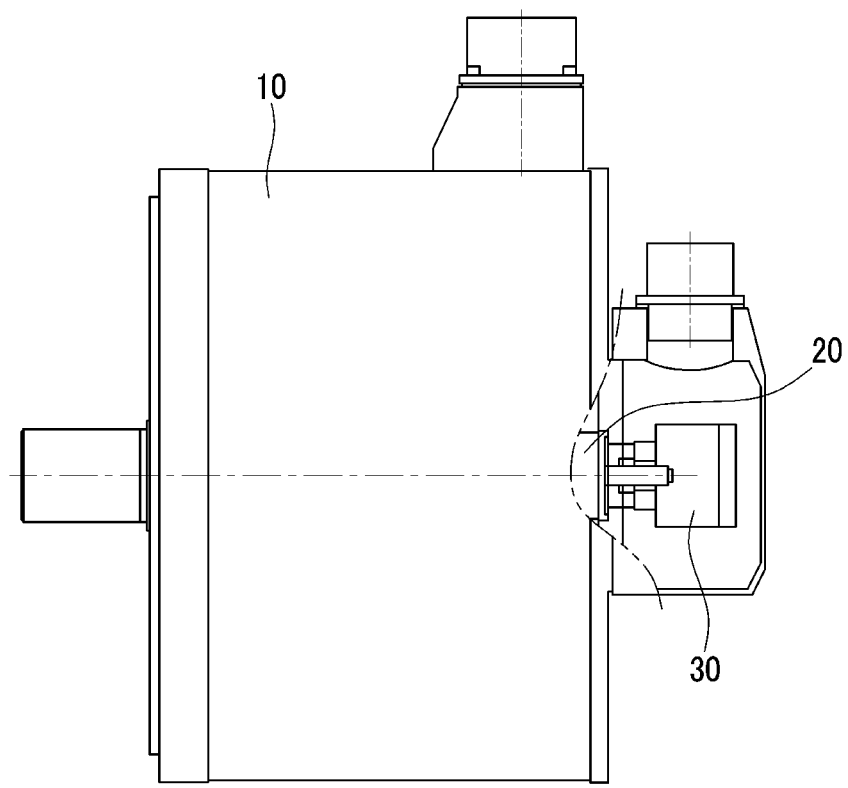
FIG. 1 is a drawing illustrating a driving mechanism of a servo motor and a rotation angle sensor in the related art.
Figure 2:
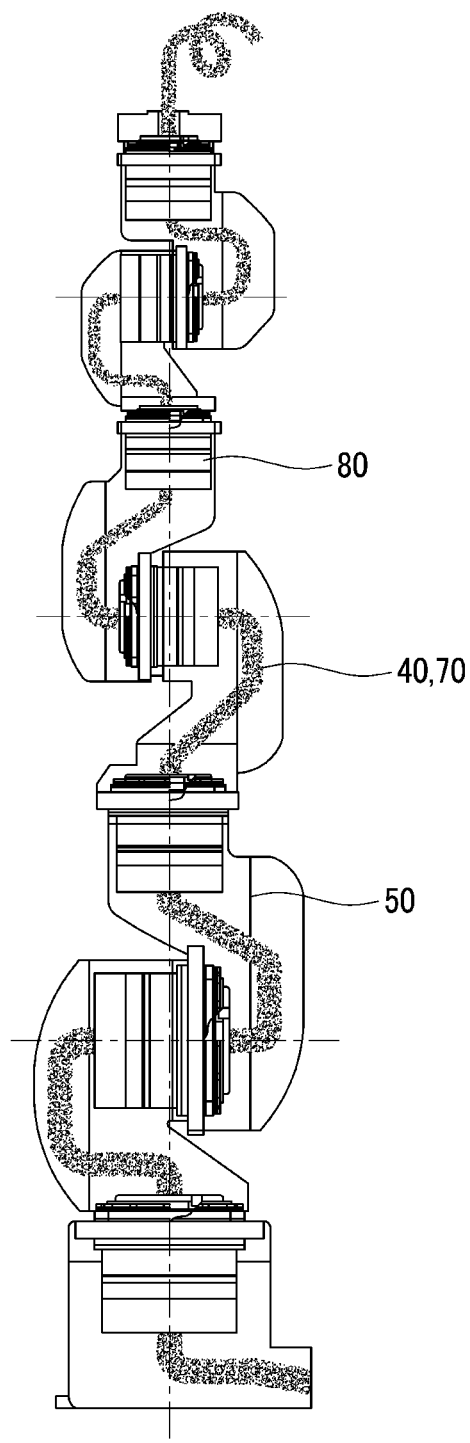
FIG. 2 is a drawing illustrating a concept of a multi-joint robot.

Hereinafter, exemplary embodiments of a hollow driving module according to the present invention will be described with reference to the accompanying drawings.
Exemplary Embodiment 1

Exemplary embodiment 1 relates to an exemplary embodiment of a hollow driving module 1 according to the present invention.

With reference to FIGS. 3 to 6, the hollow driving module of the present invention generally includes a hollow motor 110, a decelerator 120, a torque transmission unit 131, a first encoder 140, and a second encoder 150.

The hollow motor 110 includes a stator 111, a rotor 112 rotating with respect to the stator 111 and having a perforated center portion, and a rotation shaft 113 disposed at and coupled to the perforated center portion of the rotor 112 and having a perforated first hollow portion 114 at a center thereof.

The rotor 112 is wound with a coil so as to generate electromagnetic force, and both ends of the rotor 112 are connected with a power so that current flows in the coil.

The decelerator 120 is connected with the rotation shaft 113 positioned at the output side of the hollow motor 110 to decelerate the rotation of the rotation shaft 113, and includes a perforated second hollow portion 121 formed at a center thereof.

The torque transmission unit 131 is connected with the output side of the decelerator 120 to be rotatable.

The first encoder 140 is positioned at an input side opposite to a side connected with the decelerator 120 of the hollow motor 110, and is connected with the rotation shaft 113 to detect a rotation angle of the hollow motor 110, and has a perforated third hollow portion 141 at a center thereof.

The second encoder 150 is positioned at a side opposite to a side connected with the hollow motor of the first encoder 140 and has a perforated fourth hollow portion 151 at a center thereof.

Particularly, the hollow driving module of the present invention includes a link connection means 160 for connecting the second encoder 150 and the torque transmission unit 131 connected to the output of the decelerator so that the second encoder 150 may detect the rotation angle of the first driving link 161.

The link connection means 160 is connected with the torque transmission unit 131 to transmit the rotation angle of the torque transmission unit 131 to the second encoder 150. The description for the link connection means 160 is explained hereinafter.

The decelerator 120 may be a harmonic decelerator, and in this case, the harmonic decelerator includes: a cup-shaped flex spline 122 coupled with the torque transmission unit 131 and including gear teeth formed at an external circumferential surface at an opening side of a body; a circular spline 123 including gear teeth formed at an internal circumferential surface to correspond to the gear teeth formed at the external circumferential of the flex spline 122; and a wave generator 124 coupled to the internal circumferential surface of the opening of the flex spline 122 and connected with the rotation shaft 113 positioned at the output side of the hollow motor 110.

Figure 4:
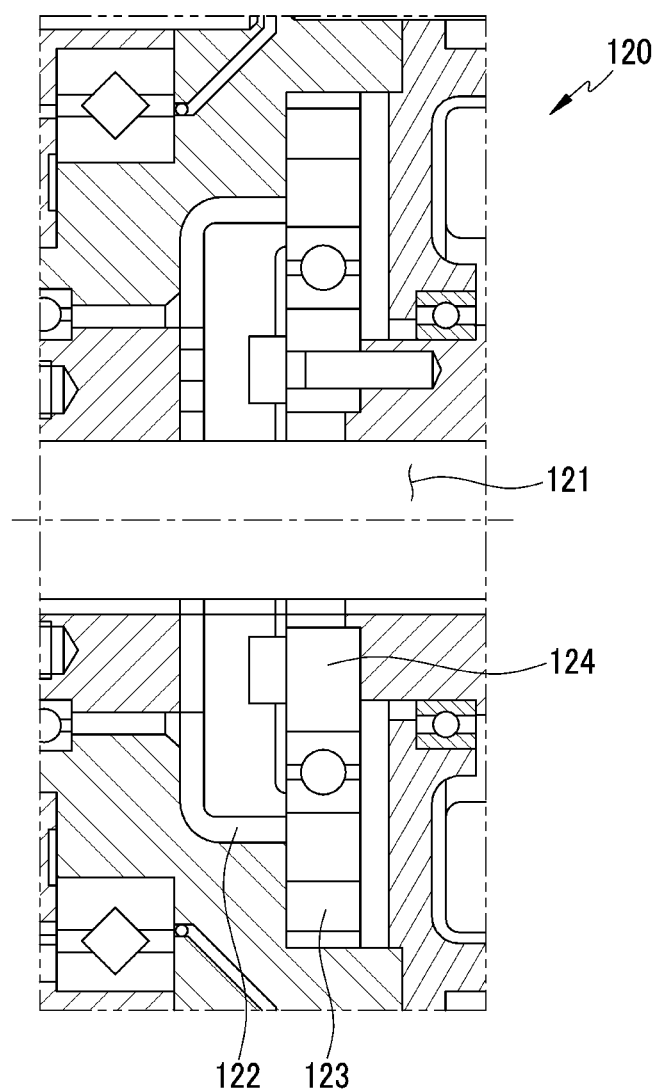
FIG. 4 is a cross-sectional view illustrating a decelerator of a hollow driving module according to an exemplary embodiment of the present invention.

To describe in detail with reference to FIG. 4, a ball bearing having flexible inner and outer rings is fitted to an outer circumference of an elliptical cam to form the wave generator 124, and the wave generator 124 is coupled inside the body opening portion of the flex spline 122.

The ball bearing includes the inner ring, the outer ring, and a plurality of balls between the inner rim and the outer ring, and the outer rim is coupled with the flex spline 122. The flex spline 122 including the elliptical cam and the bearing includes a teeth shape (gear teeth) at the external circumferential surface at the opening side of the body, and an output axis is connected to a boss of the other end of the opening.

The circular spline 123 is a fixed side of the decelerator 120, has a rigid ring shape, and includes a tooth engaged with the tooth of the flex spline 122 at an internal circumferential surface thereof to correspond to the gear at the external circumferential surface of the flex spline 122, and the circular spline 123 is fixed to a second driving link 162.

When the elliptical cam connected with the rotation shaft positioned at an input side, that is, the output side of the hollow motor 110 rotates at a predetermined speed, the inner rim of the ball bearing is rotated, and when an elongated shaft of the elliptical cam pushes the ball bearing outwardly, the tooth formed at the external circumferential surface of the flex spline 122 is pushed outwardly, so that the decelerator 120 including the aforementioned configuration is engaged with the tooth of the circular spline 123.

Accordingly, when the cam of the wave generator 124 makes one revolution in a clockwise direction, the flex spline 122 having the smaller number of gear teeth than that of the circular spline 123 is rotated in a counter clockwise direction by a difference of the number of gear teeth to achieve deceleration.

Accordingly, the torque transmission unit 131 connected with the flex spline 122 that is the output side of the decelerator 120 is decelerated by a deceleration ratio of the decelerator 120 to be driven.

In this case, in the hollow driving module 1 of the present invention, the inner rim of the cross roller bearing 171 may be connected to the circular spline 123 of the decelerator 120 and the outer rim thereof may be connected to the torque transmission unit 131 so that external force or external moment other than rotation torque of the motor is not applied to the flex spline 122 of the decelerator 120 and the torque transmission unit 131.

Figure 3:
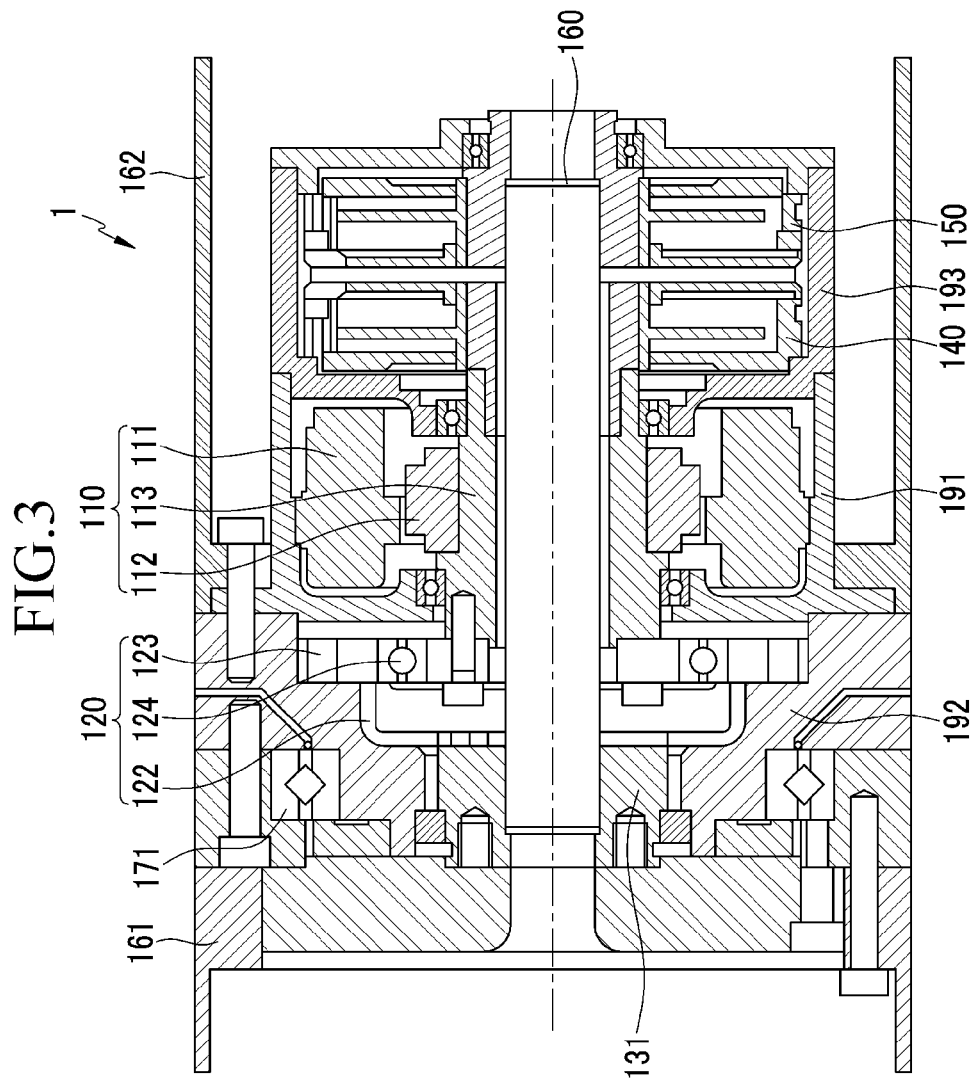
FIG. 3 is a cross-sectional view illustrating a hollow driving module according to a first exemplary embodiment of the present invention.

An entire structure of the hollow driving module 1 of the present invention will be described with reference to FIG. 3.

The hollow motor 110, the first encoder 140, and the second encoder 150 may be arranged in an axis direction so that the first hollow portion 114, the third hollow portion 141, and the fourth hollow portion 151 communicate with each other, and may be accommodated inside a motor housing 191 and an encoder housing 193.

The motor housing 191 and the encoder housing 193 are shaped like a cup, and a bottom surface of the cup-shaped encoder housing 193 is mounted in an opened side of the motor housing 191 to be coupled.

In this case, the motor housing 191 and the encoder housing 193 may be integrally formed, and may be changed to various forms for implementation if the hollow motor 110, the first encoder 140, and the second encoder 150 may be mounted and arranged therein.

The decelerator 120 is disposed in the axis direction so that the second hollow portion 121 communicates with the first hollow portion 114 of the hollow motor 110, and may be accommodated inside a decelerator housing 192. The circular spline 123 of the decelerator 120 is connected while being coupled with an inner rim of the cross roller bearing 171 through the decelerator housing 192, and the decelerator housing 192 is coupled with the motor housing 191 and the second driving link 162 to firmly support the inner rim of the cross roller bearing 171.

The torque transmission unit 131 is connected to the output side of the decelerator 120, that is, the flex spine 122, to receive torque.

The link connection means 160 is inserted inside the rotation shaft 113, and one side of the link connection means 160 is coupled with the flex spline 122, and the other side thereof is coupled with the second encoder 150. In this case, the link connection means may be coupled by an adhesive, or may be coupled through other various coupling means.

Cables of the first encoder 140 and the second encoder 150 may be wired inside the link connection means 160, and all cables of the motor, the decelerator 120, and the like may also be wired inside the link connection means 160.

The hollow driving module 1 includes the continuously connected links, and may be applied to a robot including a driving module for each rotation shaft, thereby innovatively reducing weight of the entire robot, and enables the cable of each driving module pass through the center thereof, thereby preventing damage and twist of the cable and achieving a tidier appearance.

Figure 6:
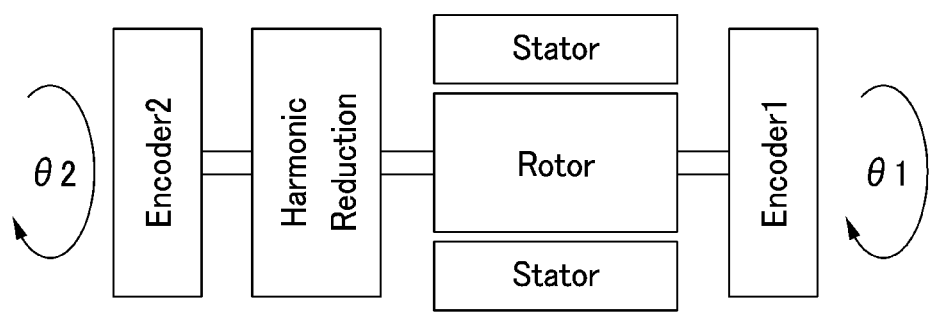
FIG. 6 is a configuration diagram of a hollow driving module according to a first exemplary embodiment.

A case in which the hollow motor 110 rotates at 6000 rpm, and a deceleration ratio of the decelerator 120 is 1/100 will be described with reference to FIG. 6.

The decelerator 120 makes the torque transmission unit 131 connected to the output side rotate at 60 rpm by decelerating the hollow motor 110.

In this case, 60 rpm is detected in the second encoder 150 connected so as to measure the actual rotation angle of the decelerator 120 in an ideal case, and a speed higher or lower than 60 rpm is detected in a non-ideal state.

Similarly, 6,000 rpm of a rotation angle is detected in the first encoder 140 connected so as to measure the actual rotation angle of the hollow motor 110 in an ideal state.

Exemplary Embodiment 2

Exemplary embodiment 2 relates to an exemplary embodiment of a hollow driving module 1 according to the present invention.

With reference to FIGS. 7 to 11, the hollow driving module of the present invention generally includes a hollow motor 210, a decelerator 220, a first driving link 261, a first encoder 240, and a second encoder 250, a link connection means 260.

Hereinafter, a detailed description of the same configuration will be omitted.

The torque transmission unit 237 is connected with the output side of the decelerator 220 to be rotatable, and an outer side of the torque sensor 230 is connected with an outer rim of a cross roller bearing 271 to be supported, and is connected with the decelerator 220 through the torque transmission unit 237 to measure torque transmitted from the output side of the decelerator 220.

An outer side of the torque sensor 230 is connected with an outer rim of a cross roller bearing 271 to be supported, and is connected with the decelerator 220 through the torque transmission unit 237 to measure torque transmitted from the output side of the decelerator 220.

Figure 5:
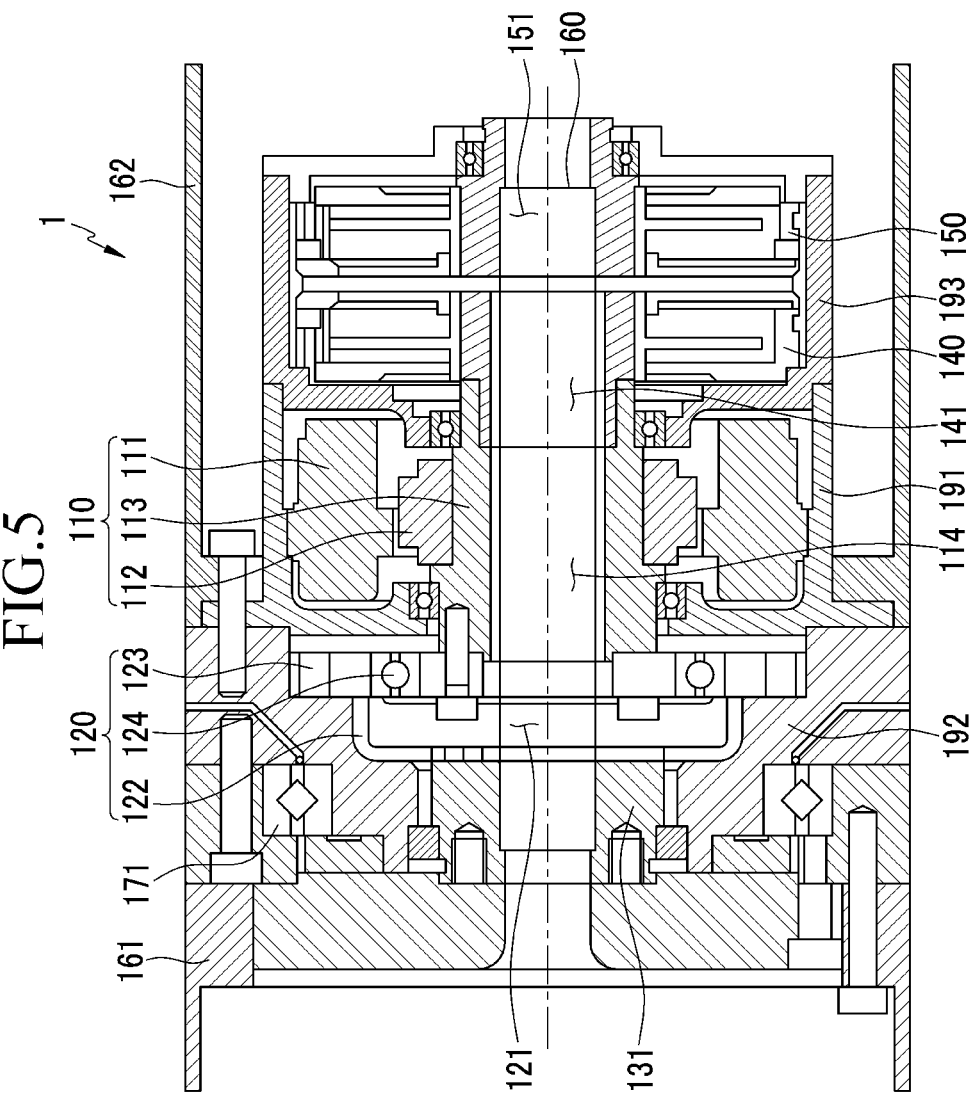
FIG. 5 is a cross-sectional view illustrating a state in which a link connection means is separated from a hollow driving module according to a first exemplary embodiment of the present invention.

In the meantime, as illustrated in FIG. 5, the torque sensor 230 includes: an interior frame 231 having a fifth hollow portion 235 communicating with the second hollow portion; an exterior frame 232 spaced apart from the interior frame 231 by a predetermined distance in the radial direction; one or more connection beams 233 formed between the interior frame 231 and the exterior frame 232 to measure torque transmitted from the output side of the decelerator; and a strain gauge 234 formed at one side or both sides of the connection beam 233 to measure torque according to the amount of transformation of the connection beam 233, and may be the torque sensor 230 for measuring one degree of freedom of a generally used simple function, that is, moment applied in a direction of the output side of the hollow motor 210.

The interior frame 231 is connected with the torque transmission unit 237 by using a fastening means, such as a bolt, and the exterior frame 232 is simultaneously connected with the first driving link 261 and the outer rim of the cross roller bearing 271 to be supportable.

As described above, the first driving link 261 is disposed at an edge of the torque sensor 230 to be connected.

Here, the strain gauge 234 senses the amount of transformation of the connection beam 233 by external force transmitted from the output side of the decelerator 220 and measures torque by the sensed amount of transformation.

The link connection means 260 includes a pipe-shaped first connection member 260a inserted in the first to fourth hollow portions 214, 221, 241, and 251 to be connected with the second encoder 250 and a second connection member 260b of which an end positioned at a side positioned in the torque sensor 230 radially extends to be connected to the first driving link 261.

Figure 9:
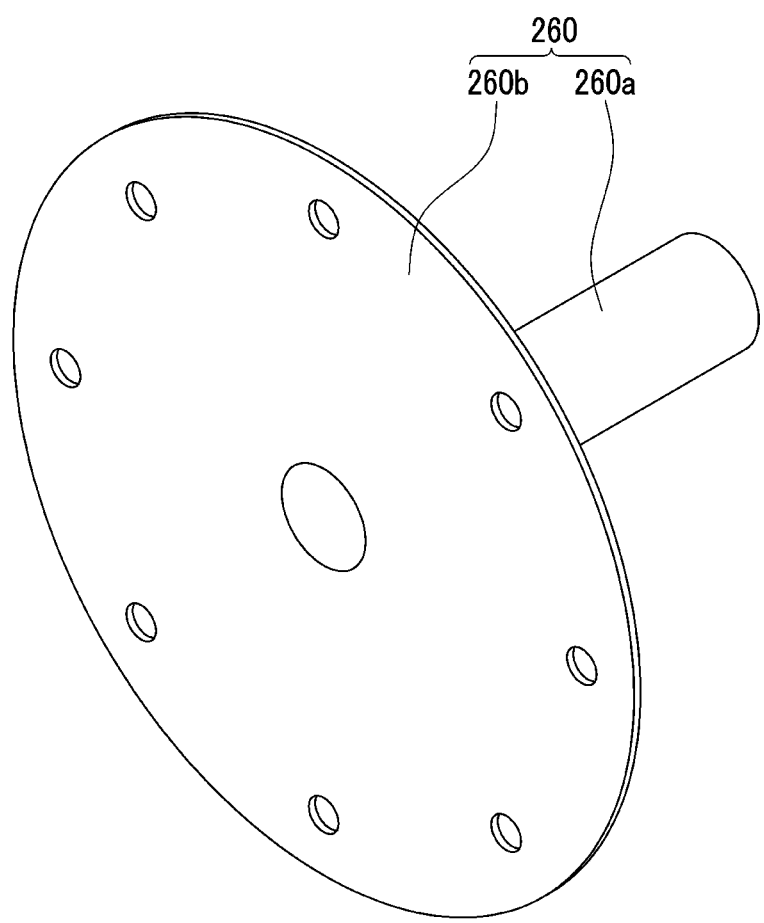
FIG. 9 is a perspective view illustrating a link connection means of a hollow driving module according to an exemplary embodiment of the present invention.
Figure 10:
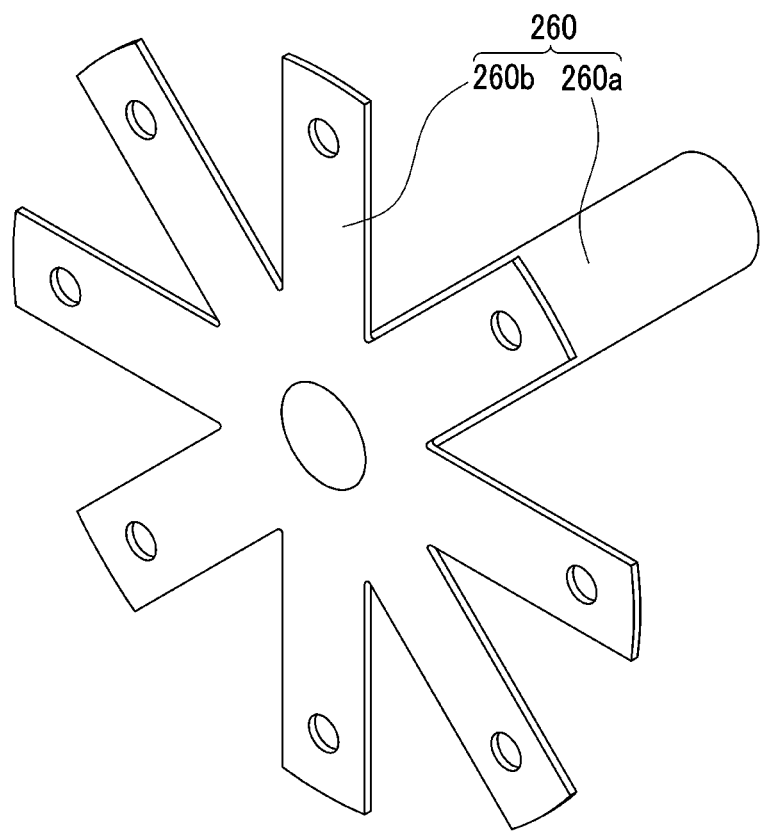
FIG. 10 is a perspective view illustrating another link connection means of a hollow driving module according to an exemplary embodiment of the present invention.

The second connection member 260b may extend from the end of one side of the first connection member 260a to the first driving link 261 in a radial direction to have a form of a plurality of bars spaced apart from each other by a predetermined distance in the radial direction as illustrated in FIG. 9, and the second connection member 260*b* may have a donut-shaped plate in which a center of a region extending to the first driving link 261 is hollow as illustrated in FIG. 10.

The first connection member 260*a* has a thickness of approximately 0.5 mm and the second connection member 260*b* has a thickness of approximately 1 mm, so that the link connection means 260 may be formed so that the rotation angle of the first driving link 261 may be transmitted to the second encoder 250.

Further, the hollow driving module 1 of the present invention may include a first bearing 272 of which an inner rim is connected with the link connection means so as to prevent the link connection means from being shaken, and a second bearing 273 of which an inner rim is connected with the rotation shaft 213 so as to prevent the rotation shaft 213 from being shaken. The first bearing 272 and the second bearing 273 may be a general roll bearing.

Figure 11:
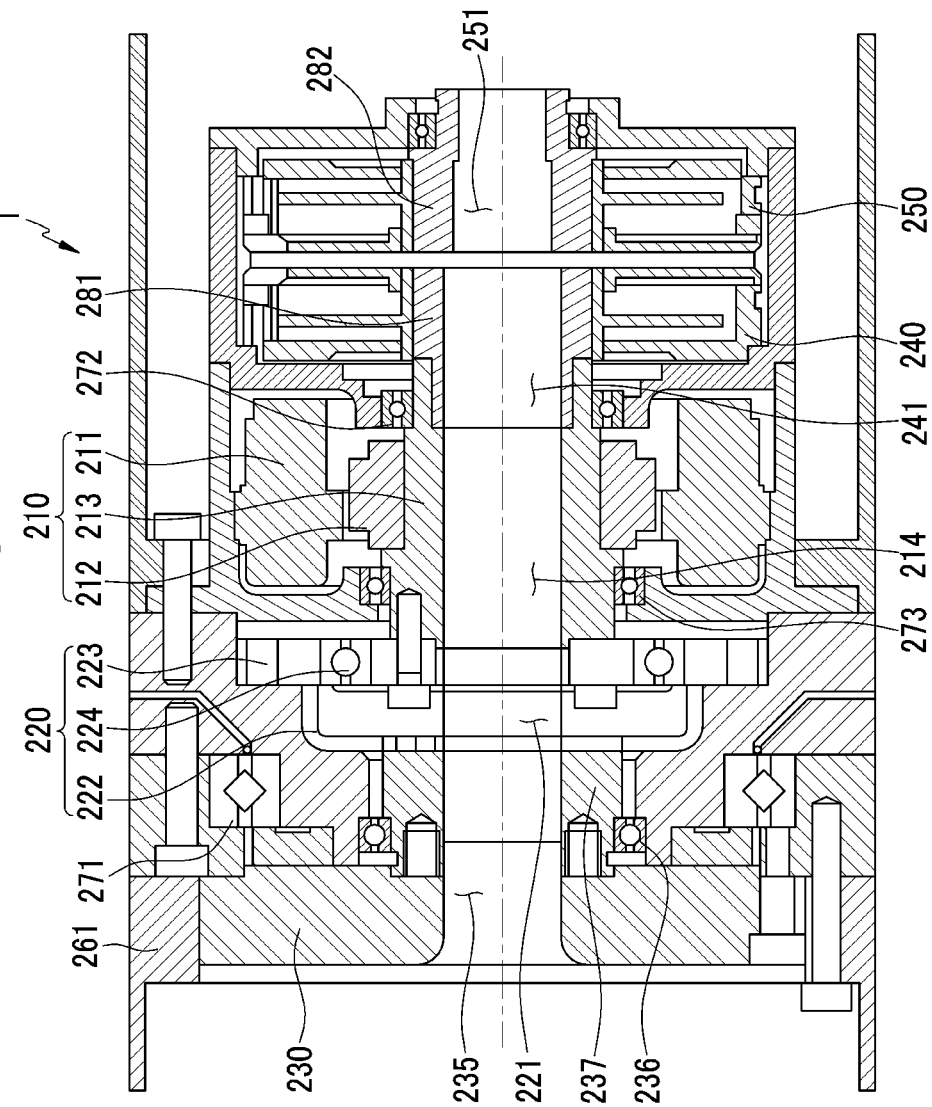
FIG. 11 is a cross-sectional view illustrating a state in which a link connection means is separated from a hollow driving module according to a second exemplary embodiment of the present invention.

In the meantime, as illustrated in FIG. 11, the third hollow portion 241 and the fourth hollow portion 251 have the same diameter, and the hollow driving module 1 of the present invention may include a first ring portion 281 having an internal circumferential surface with a larger diameter than that of an external circumferential surface of the first connection member between the third hollow portion 241 and the first connection member, and a second ring portion 282 having an internal circumferential surface having the same diameter as the external circumferential surface of the first connection member between the fourth hollow portion 251 and the first connection member.

Accordingly, the hollow driving module 1 of the present invention may use the first encoder 240 and the second encoder 250 having the same type and the same size, and may employ a generally used bought encoder, so that there is an advantage in that it is not necessary to customize the encoder.

Figure 7:
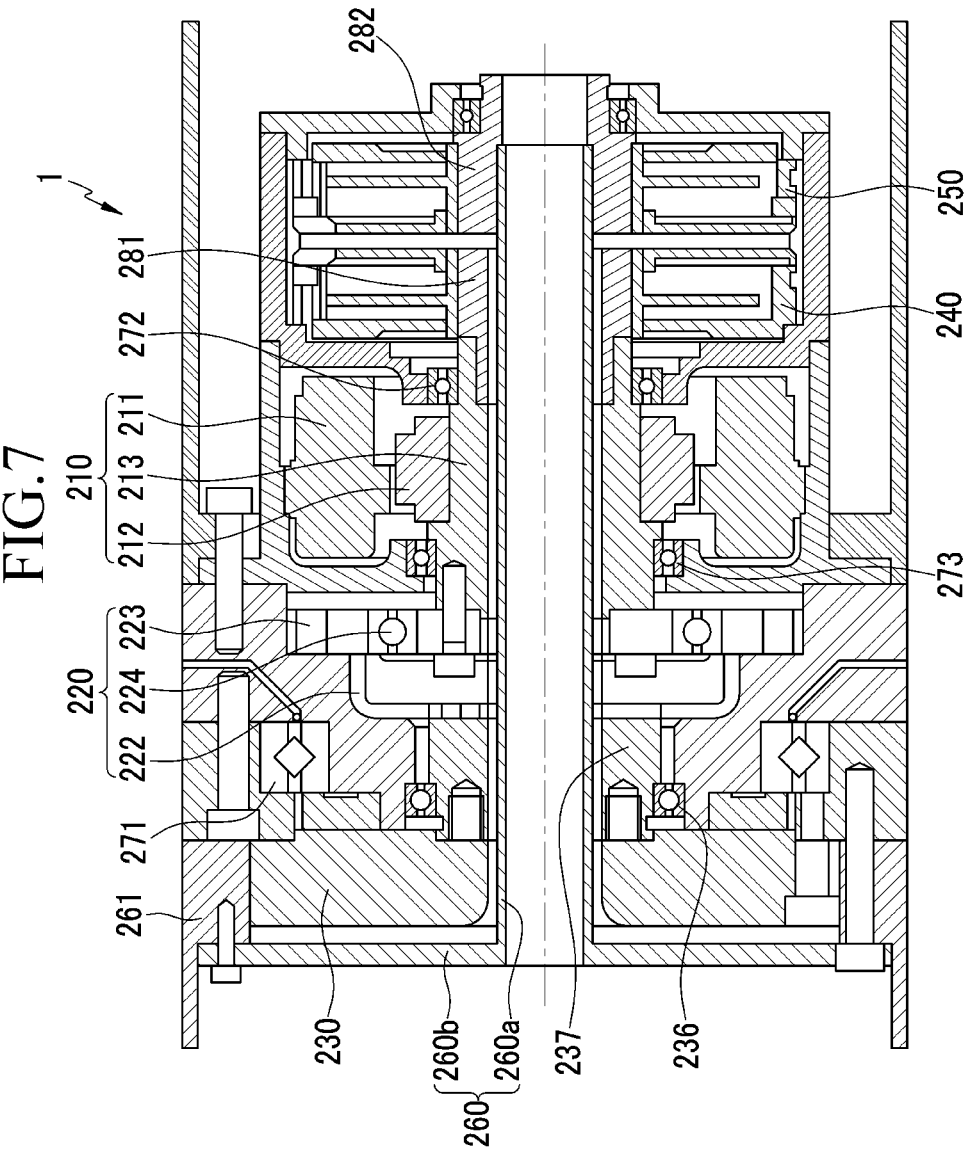
FIG. 7 is a cross-sectional view illustrating a hollow driving module according to a second exemplary embodiment of the present invention.
Figure 8:
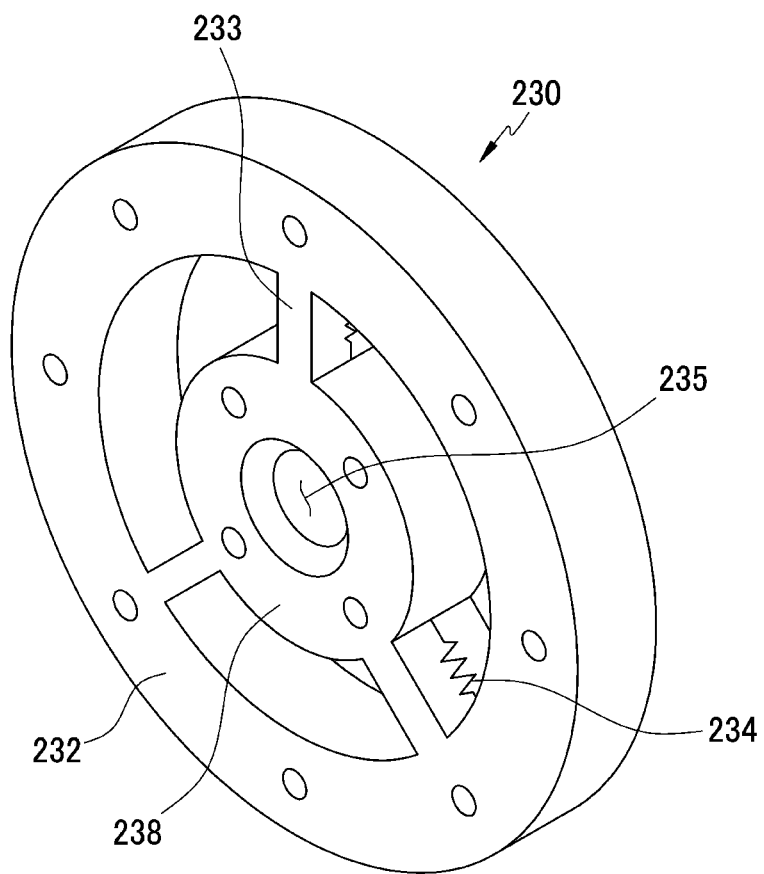
FIG. 8 is a perspective view of a torque sensor of a hollow driving module according to an exemplary embodiment of the present invention.

As illustrated in FIGS. 7 and 11, in the hollow driving module 1 of the present invention, the external circumferential surface of the first connection member is in contact with the internal circumferential surface of the second ring portion 282 to be coupled to each other, and a space spaced by approximately 0.5 mm may be formed between the internal circumferential surface of the first, second, and fifth hollow portions 214, 221, and 235 and the first ring portion 281, and the external circumferential surface of the first connection member 260*a*. Through this, the link connection means 260 is disposed while being spaced apart from the rotation shaft 213, the torque sensor 230, and the first encoder 240 at a predetermined distance, so that the hollow driving module 1 of the present invention may smoothly rotate, prevent friction and abrasion which may be generated during the rotation, and rotate together with the second encoder 250 through the coupling of the second encoder 250 only.

The hollow driving module 1 of the present invention may further include the blocking bearing 236 installed between the torque transmission unit 237 and the fixed side of the decelerator 220 to block axis-directional force transmitted from the output side of the decelerator 220 to the torque sensor 230.

An inner rim of the blocking bearing 236 is coupled with the torque transmission unit 237, and an outer rim of the blocking bearing 236 is connected with the fixed side of the decelerator 220, thereby offsetting axis-directional displacement creatable according to push in or out of the output side of the decelerator 220.

The blocking bearing 236 may be a ball bearing having small clearance of 10 to 50 μm. When the clearance of the blocking bearing 236 is 10 μm, maximum displacement applicable in the axis direction is 10 μm, and displacement higher than 10 μm is offset by the blocking bearing 236, so that an error of the torque measurement by the torque sensor 230 may be decreased.

Accordingly, the hollow driving module 1 of the present invention may decrease an error of the torque sensor 230 and measure both the rotation angle of the hollow motor and the actual torque of the output side applied to the first driving link, thereby improving control accuracy.

Figure 12:
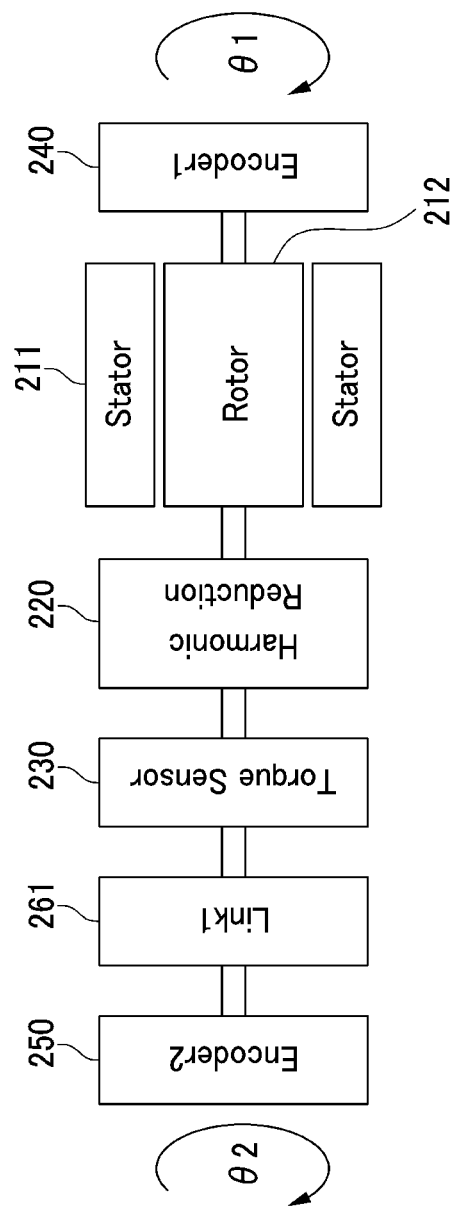
FIG. 12 is a configuration diagram of a hollow driving module according to a second exemplary embodiment.

A case in which the hollow motor 210 rotates at 3,200 rpm, and a deceleration ratio of the decelerator 220 is 1/50 will be described with reference to FIG. 12.

The decelerator 220 makes the first driving link 261 connected to the output side rotate at 64 rpm by decelerating the hollow motor 210.

In this case, 64 rpm is detected in the second encoder 250 connected so as to measure the actual rotation angle of the decelerator 220 in an ideal case, and a speed higher or lower than 64 rpm is detected in a non-ideal state.

Similarly, 6,000 rpm of a rotation angle is detected in the first encoder 240 connected so as to measure the actual rotation angle of the hollow motor 210 in an ideal state.

As described above, since the second encoder 250 is decelerated by the decelerator to be rotated, the second encoder 250 may be a highly precious encoder for low-speed rotation, and since the first encoder 240 rotates at a high speed, the first encoder 240 may be a general encoder for high-speed rotation.

Exemplary Embodiment 3

Exemplary embodiment 3 relates to an exemplary embodiment of an operation of the hollow driving module 1 of the present invention.

Figure 13:
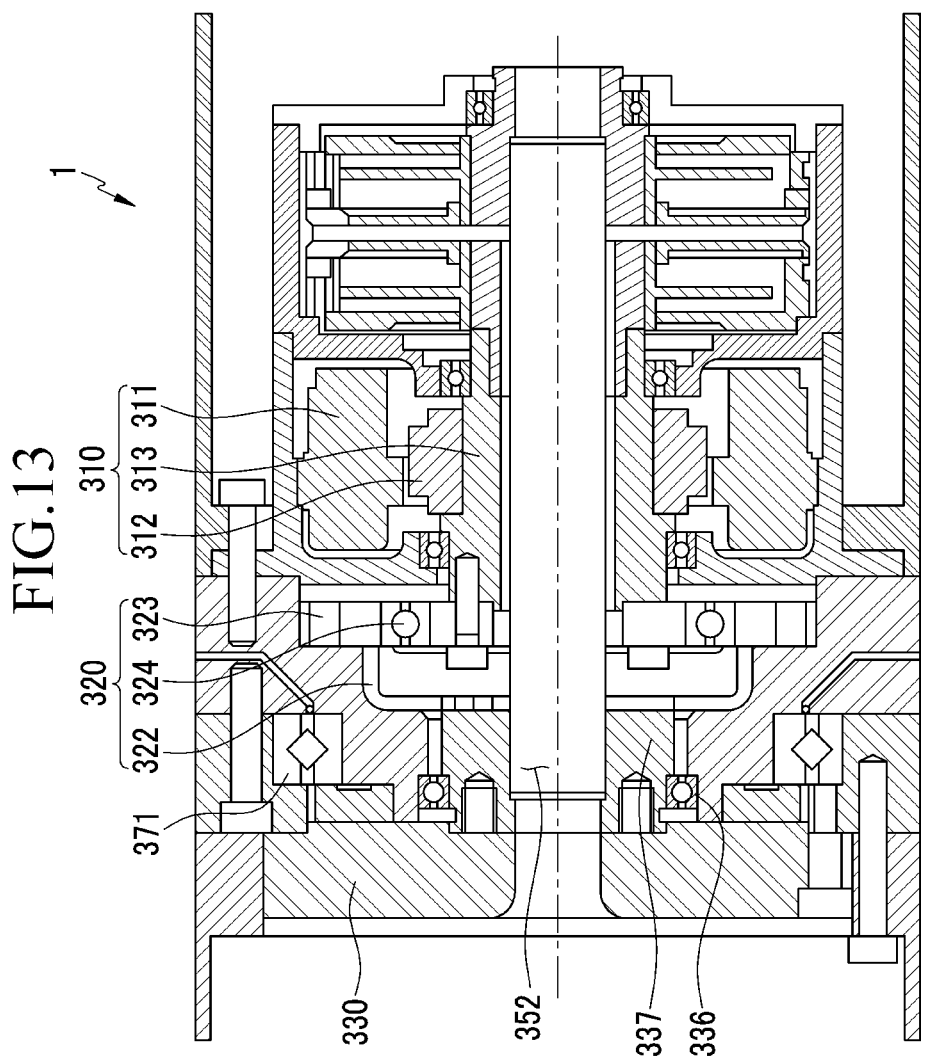
FIG. 13 is a cross-sectional view illustrating a hollow driving module according to a third exemplary embodiment of the present invention.
Figure 14:
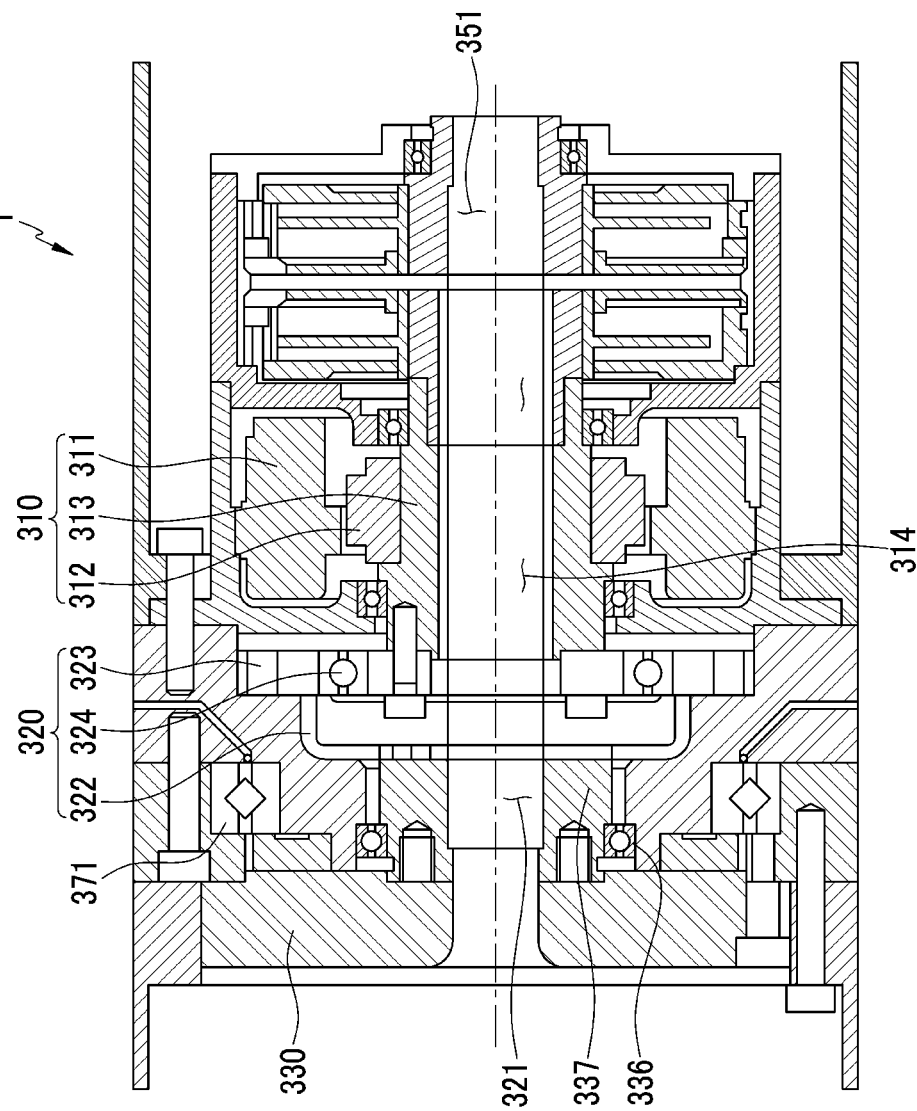
FIG. 14 is a cross-sectional view illustrating a state in which a link connection means is separated from a hollow driving module according to a third exemplary embodiment of the present invention.
Figure 15:
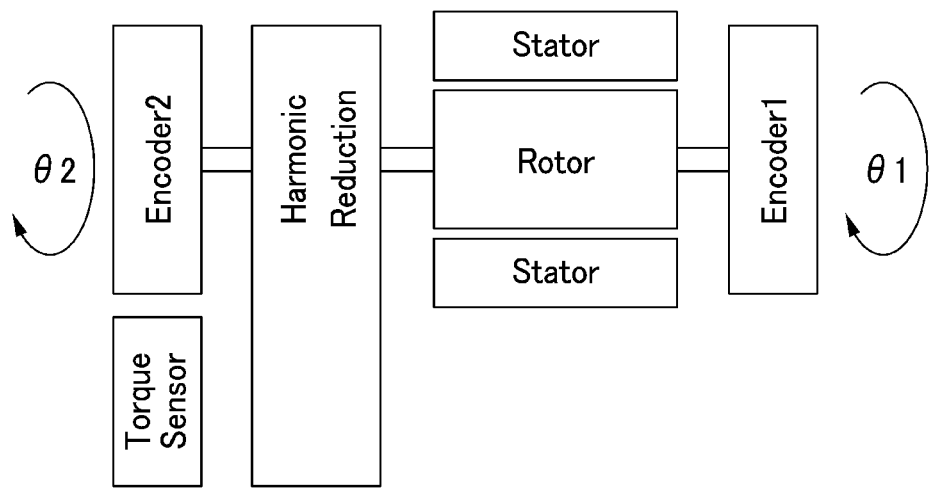
FIG. 15 is a configuration diagram of a hollow driving module according to a third exemplary embodiment.

With reference to FIGS. 13 and 14, the hollow driving module of the present invention generally includes a hollow motor 310, a decelerator 320, a torque transmission unit 337, a blocking bearing 336.

Hereinafter, a detailed description of the same configuration will be omitted.

The torque transmission unit 337 is connected with the output side of the decelerator 320 to be rotatable, and an outer side of the torque sensor 330 is connected with an outer rim of a cross roller bearing 371 to be supported, and is connected with the decelerator 320 through the torque transmission unit 337 to measure torque transmitted from the output side of the decelerator 320.

In the meantime, the decelerator 320 may be a harmonic decelerator. A detailed description of the decelerator 320 will be omitted.

An inner rim of the blocking bearing 336 is coupled with the torque transmission unit 337, and an outer rim of the blocking bearing 336 is connected with the fixed side of the decelerator 320, thereby offsetting axis-directional displacement creatable according to push in or out of the output side of the decelerator 320.

In the Exemplary embodiment 3, the hollow driving module 1 includes a first encoder and a second encoder, so that the hollow driving module can measure the torque of an output side of the decelerator, the rotation angle of the output side and the rotation angle of the hollow motor.

The link connection means 352 is inserted in the first to fourth hollow portions 314, 321, 341, and 351. The link connection means 352 connects the fourth hollow portions 351 to the output side of the decelerator 320, so that the rotation angle of the output side of the decelerator 320 is measured.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 1: Hollow driving module | |
| 110: Hollow motor | |
| 111: Stator | 112: Rotor |
| 113: Rotation shaft | 114: First hollow portion |
| 120: Decelerator | |
| 121: Second hollow portion | 122: Flex spline |
| 123: Circular spline | 124: Wave generator |
| 230: Torque sensor | |
| 231: Interior frame | 232: Exterior frame |
| 233: Connection beam | 234: Strain gauge |
| 235: Fifth hollow portion | 236: Blocking bearing |
| 237: Torque transmission unit | |
| 140: First encoder | 141: Third hollow portion |
| 150: Second encoder | 151: Fourth hollow portion |
| 231: Link connection means | |
| 231a: First connection member | 231b: Second connection member |
| 261: First driving link | 262: Second driving link |
| 271: Cross roller bearing | 272: First bearing |
| 273: Second bearing | |
| 281: First ring portion | 282: Second ring portion |
| 291: Motor housing | 292: Decelerator housing |
| 293: Encoder housing | |

What is claimed is:

1. A hollow driving module, comprising:
a hollow motor including a stator, a rotor rotating with respect to the stator and having a perforated center portion, and a rotation shaft disposed at and coupled to the perforated center portion of the rotor and having a perforated first hollow portion at a center thereof;
a decelerator connected with the rotation shaft positioned at an output side of the hollow motor to decelerate rotation of the rotation shaft and having a perforated second hollow portion at a center thereof;
a torque transmission unit being connected to an output side of the decelerator to be driven by a decelerated rotation angle;
a first encoder positioned at an input side opposite to a side connected with the decelerator of the hollow motor, connected with the rotation shaft to measure a rotation angle of the hollow motor, and having a perforated third hollow portion at a center thereof;
a second encoder positioned at a side opposite to a side connected with the hollow motor of the first encoder and measuring a rotation angle of the output side of the decelerator and having a perforated fourth hollow portion at a center thereof;
a link connection means connecting the second encoder with the torque transmission unit;
a cross roller bearing of which an inner rim is connected with a circular spline of the decelerator and an outer rim is connected with the torque transmission unit; and
a torque sensor of which an exterior side is connected to the outer rim of the cross roller bearing to be supported and being connected with the decelerator through the torque transmission unit to measure torque transmitted from the output side of the decelerator,
wherein, a first driving link is disposed at an edge of the torque sensor,
wherein:
the decelerator is a harmonic decelerator, and comprises:
a cup-shaped flex spline connected with the torque transmission unit and provided with gear teeth at an external circumferential surface at an opening side of a body;
the circular spline provided with gear teeth at an internal circumferential surface to correspond to the gear teeth at the external circumferential surface of the flex spline; and
a wave generator coupled to the internal circumferential surface of the opening of the flex spline and connected with the rotation shaft positioned at the output side of the hollow motor,
wherein the link connection means including:
a pipe-shaped first connection member inserted in the first to the fourth hollow portions to be connected with the second encoder; and
a second connection member of which an end at a side position in the torque sensor extends in a radial direction to be connected to the first driving link.

2. The hollow driving module of claim 1, wherein:
the torque sensor is a torque sensor of one degree of freedom comprising:
an interior frame having a fifth hollow portion communicating with the second hollow portion;
an exterior frame formed while being spaced apart from the interior frame by a predetermined distance in a radial direction;
one or more connection beams formed between the interior frame and the exterior frame and configured to measure torque transmitted from the output side of the decelerator; and
a strain gauge formed at one side or both sides of the connection beam to measure torque by the amount of transformation of the connection beam.

3. The hollow driving module of claim 2, wherein:
the third hollow portion and the fourth hollow portion have the same diameter, and
the hollow driving module includes a first ring portion having an internal circumferential surface having a larger diameter than that of an external circumferential surface of the first connection member between the third hollow portion and the first connection member, and
a second ring portion having an internal circumferential surface having the same diameter as that of the external circumferential surface of the first connection member between the fourth hollow portion and the first connection member.

4. The hollow driving module of claim 1, further comprising:
a blocking bearing installed between the torque transmission unit and the circular spline of the decelerator to block axis-directional force transmitted from the output side of the decelerator to the torque sensor.

5. The hollow driving module of claim 4, wherein:
the blocking bearing
is a ball bearing having clearance of 10 to 50 μm.

6. The hollow driving module of claim 1, further comprising:
a first bearing of which an inner rim is connected with the first connection member so as to prevent the first connection member from being shaken; and
a second bearing of which an inner rim is connected with the rotation shaft so as to prevent the rotation shaft from being shaken.

7. The hollow driving module of claim 1, wherein:
the second connection member
extends from an end of one side of the first connection member to the first driving link in a radial direction, and
is shaped like a plurality of bars spaced apart from each other by a predetermined distance in a circumferential direction.

8. The hollow driving module of claim 1, wherein:
the second connection member
extends from an end of one side of the first connection member to the first driving link in a radial direction, and
is a donut-shaped plate having a hollow center.

9. The hollow driving module of claim 1, wherein:
the hollow driving module
is applied to a joint of a robot.

10. A hollow driving module, comprising:
a hollow motor including a stator, a rotor rotating with respect to the stator and having a perforated center portion, and a rotation shaft disposed at and coupled to the perforated center portion of the rotor and having a perforated first hollow portion at a center thereof;
a decelerator connected with the rotation shaft positioned at an output side of the hollow motor to decelerate rotation of the rotation shaft and having a perforated second hollow portion at a center thereof;
a torque transmission unit being connected to an output side of the decelerator to be driven by a decelerated rotation angle;
a torque sensor of which an exterior side is connected to an outer rim of the cross roller bearing to be supported and being connected with the decelerator through the torque transmission unit to measure torque transmitted from the output side of the decelerator;
a blocking bearing installed between the torque transmission unit and the fixed side of the decelerator to block axis-directional force transmitted from the output side of the decelerator to the torque sensor.

11. The hollow driving module of claim 10, wherein:
the decelerator is a harmonic decelerator, and comprises:
a cup-shaped flex spline connected with the torque transmission unit and provided with gear teeth at an external circumferential surface at an opening side of a body;
a circular spline provided with gear teeth at an internal circumferential surface to correspond to the gear teeth at the external circumferential surface of the flex spline and serving as a fixed side for supporting an inner rim of the cross roller bearing; and
a wave generator coupled to the internal circumferential surface of the opening of the flex spline and connected with the rotation shaft positioned at the output side of the hollow motor.

12. The hollow driving module of claim 10, wherein:
the torque sensor is a torque sensor of one degree of freedom comprising:
an interior frame having a fifth hollow portion communicating with the second hollow portion;
an exterior frame formed while being spaced apart from the interior frame by a predetermined distance in a radial direction;
one or more connection beams formed between the interior frame and the exterior frame and configured to measure torque transmitted from the output side of the decelerator; and
a strain gauge formed at one side or both sides of the connection beam to measure torque by the amount of transformation of the connection beam.

13. The hollow driving module of claim 10, wherein:
the blocking bearing
is a ball bearing having clearance of 10 to 50 μm.

14. The hollow driving module of claim 10, further comprising:
a first encoder positioned at an input side opposite to a side connected with the decelerator of the hollow motor, connected with the rotation shaft to measure a rotation angle of the hollow motor, and having a perforated third hollow portion at a center thereof.

15. The hollow driving module of claim 14, further comprising:
a second encoder positioned at a side opposite to a side connected with the hollow motor of the first encoder and having a perforated fourth hollow portion at a center thereof and measuring a rotation angle of the output side of the decelerator by being connected the fourth hollow portion to the output side of the decelerator through a pipe-shaped link connection means inserted in the first to the fourth hollow portions.

* * * * *